Figure 1:
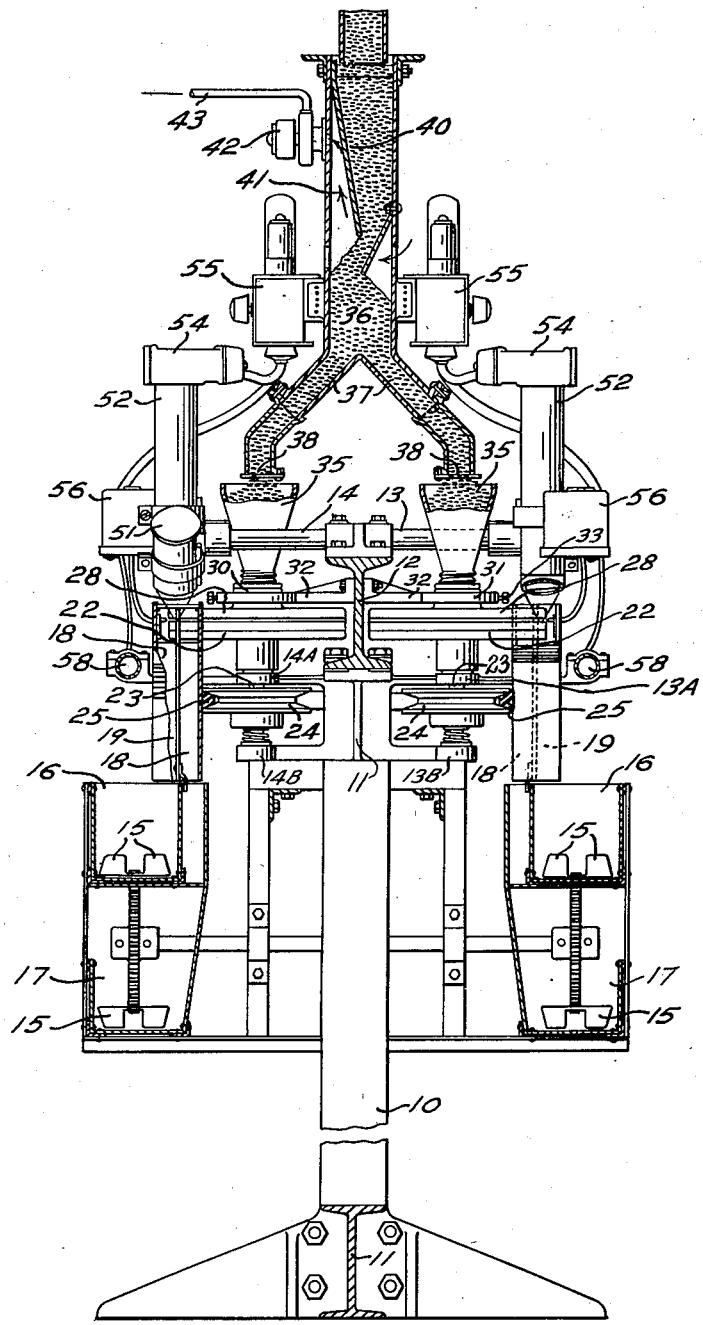

Dec. 25, 1951      E. H. BICKLEY      2,580,275
COLOR SORTING MACHINE

Filed Aug. 8, 1945      6 Sheets-Sheet 1

INVENTOR
EVERETT H. BICKLEY
BY
Barr, Borden & Fox
ATTORNEYS

Dec. 25, 1951 E. H. BICKLEY 2,580,275
COLOR SORTING MACHINE
Filed Aug. 8, 1945 6 Sheets-Sheet 2

INVENTOR
EVERETT H. BICKLEY
BY
ATTORNEYS

Dec. 25, 1951  E. H. BICKLEY  2,580,275
COLOR SORTING MACHINE
Filed Aug. 8, 1945  6 Sheets-Sheet 3

INVENTOR
EVERETT H. BICKLEY
BY
Barr, Borden & Foy
ATTORNEYS

Dec. 25, 1951

E. H. BICKLEY 2,580,275

COLOR SORTING MACHINE

Filed Aug. 8, 1945

6 Sheets-Sheet 4

INVENTOR
EVERETT H. BICKLEY
BY
Barr, Borden & Fox
ATTORNEYS

Dec. 25, 1951  E. H. BICKLEY  2,580,275
COLOR SORTING MACHINE
Filed Aug. 8, 1945 6 Sheets-Sheet 5

INVENTOR
EVERETT H. BICKLEY
BY
Barr, Bander & Fox
ATTORNEYS

INVENTOR
EVERETT H. BICKLEY
BY
Barr, Borden + Fox
ATTORNEYS

Patented Dec. 25, 1951

2,580,275

UNITED STATES PATENT OFFICE 2,580,275

COLOR SORTING MACHINE

Everett H. Bickley, Bala-Cynwyd, Pa.

Application August 8, 1945, Serial No. 609,619

11 Claims. (Cl. 209—111)

The present invention relates to machines for sorting objects by color and more particularly to improvements upon the machines of applicant's Patents Nos. 1,921,862 and 1,921,863.

With the introduction of automatic machines for sorting objects by color to segregate all objects of one color from others having different or variations of that color, the old and long-established hand sorting by eye inspection has generally become obsolete. However, while the results of machine sorting have been highly efficient, the trade has become more and more insistent in its demands for higher standards of segregation than has heretofore been possible. In other words, the trade is no longer satisfied with the increased efficiency and lower cost of automatic sorting as compared to hand sorting, but now advances as requirements standards of comparison involving the minutest variations of color.

Some of the objects of the present invention are: to provide an improved machine for sorting objects by color; to provide a sorting machine wherein the speed of sorting is materially increased without adversely affecting accurate segregation; to provide a machine for sorting objects by color wherein a novel inspection system operates to reduce specular glare of the object to a minimum; to provide means in a machine for sorting beans, rice, and other objects by color at a speed not heretofore attained by present day machines; to provide a sorting machine wherein errors due to improper inspection are substantially eliminated; to provide a sorting machine having a high degree of sensitivity to color variations; to provide an improved conveying means for objects to be sorted wherein the beans, rice or other objects are brought to an inspection point successively and arranged to present the same inspection area of each object to the light control system; to provide a novel reflector for focussing a light beam on an object to be sorted; to provide means for detecting variation in the covering of an insulated wire; and to provide other improvements as will hereinafter appear.

Figure 2:
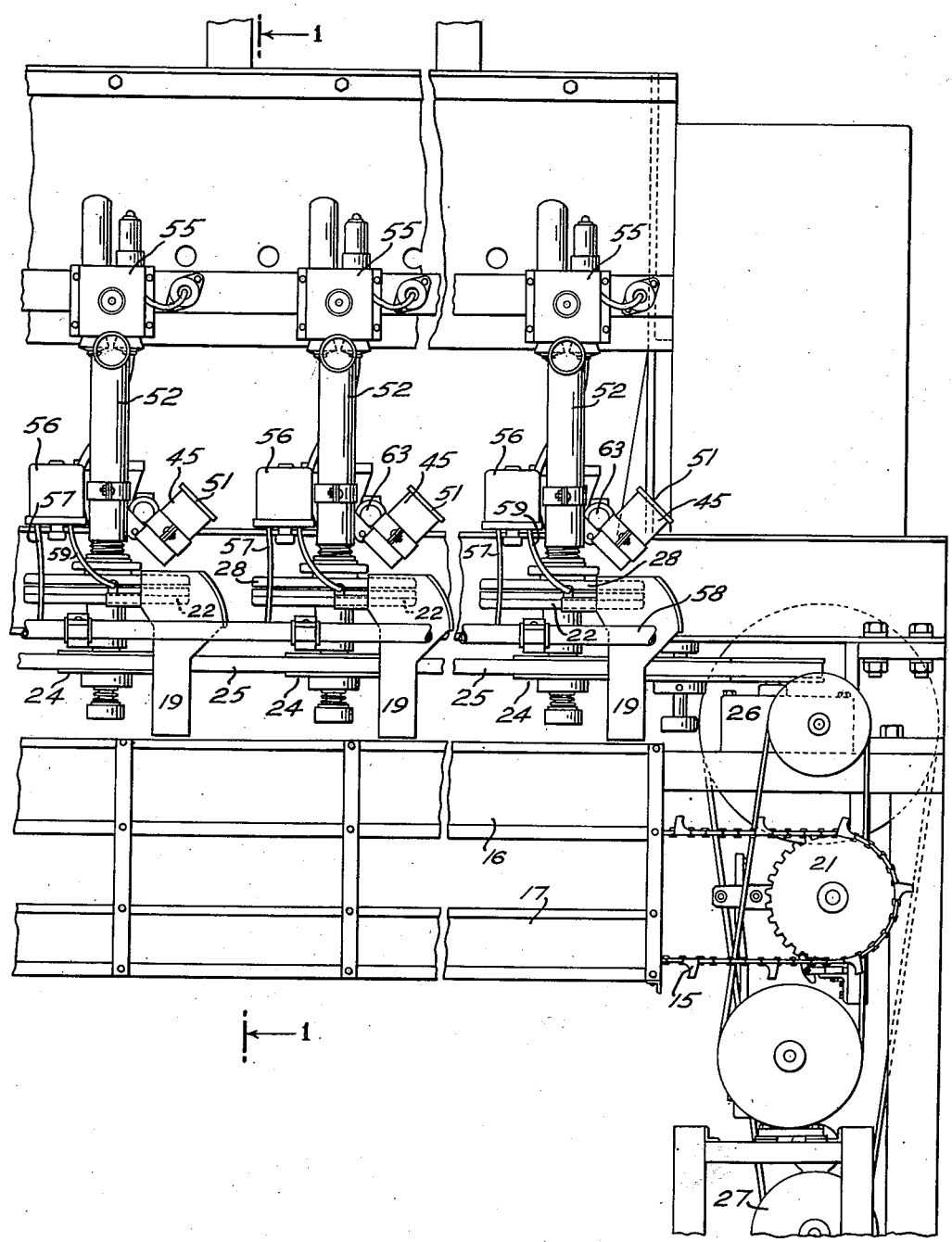
Figure 3:
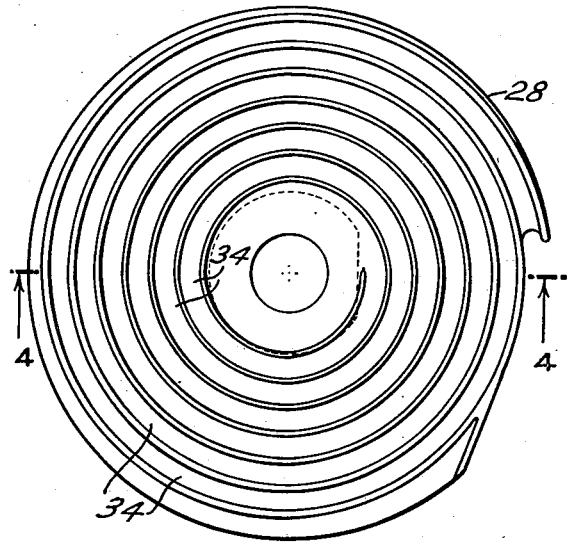
Figure 4:
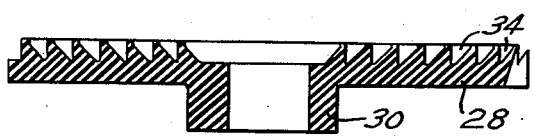
Figure 11:
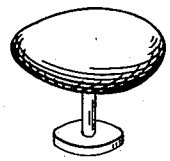
Figure 12:
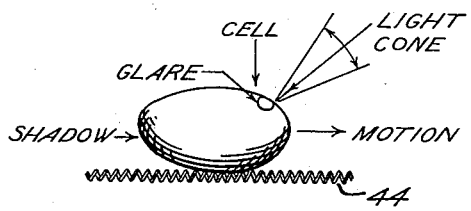
Figure 13:
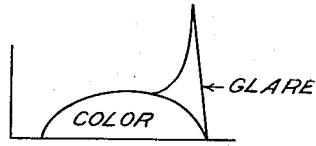
Figure 14:
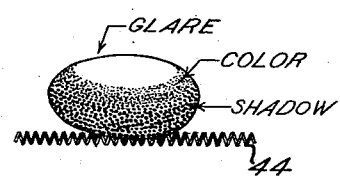
Figure 15:
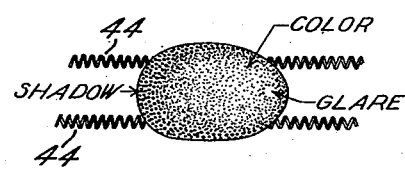
Figure 5:
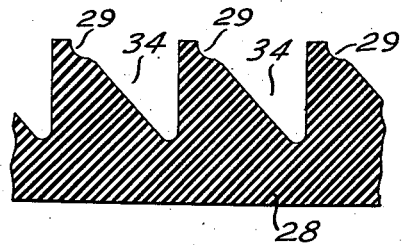
Figure 6:
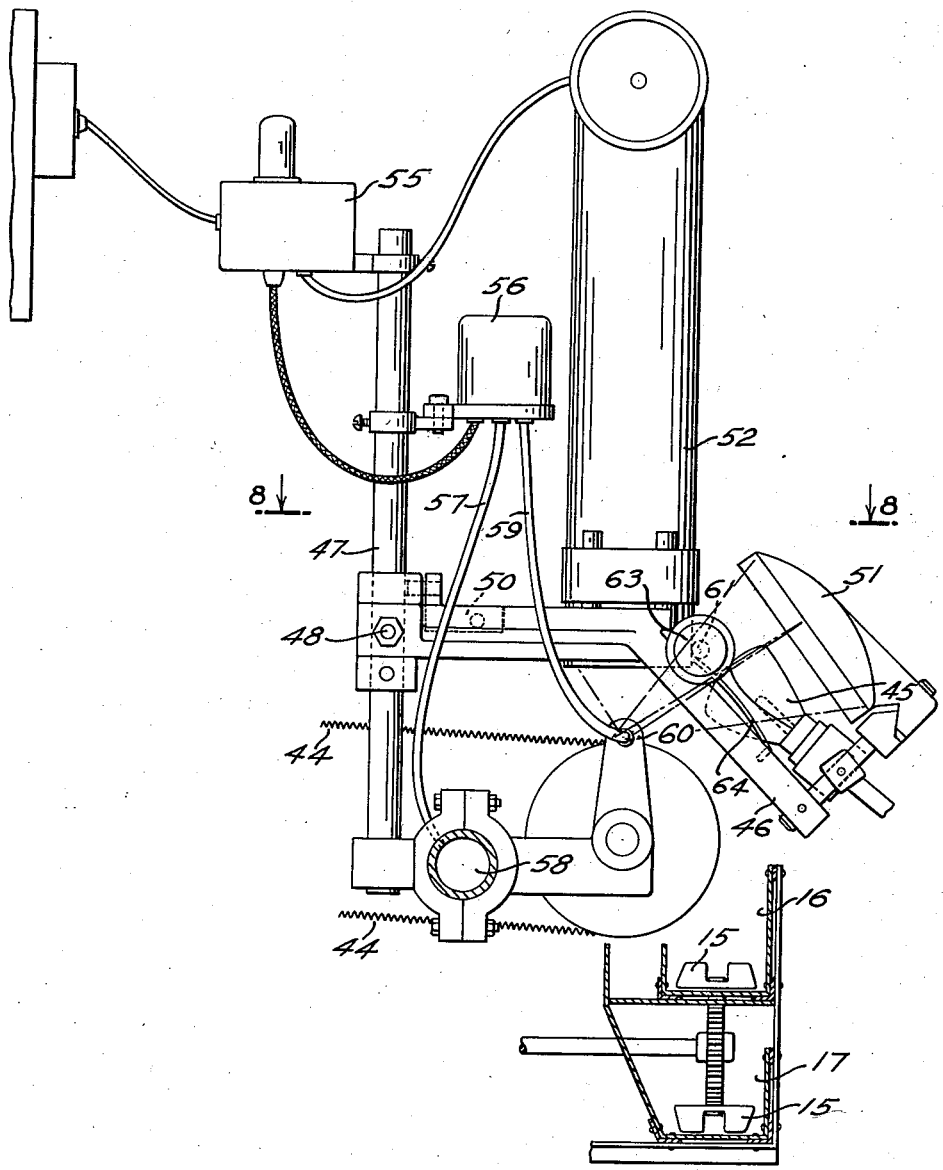
Figure 7:
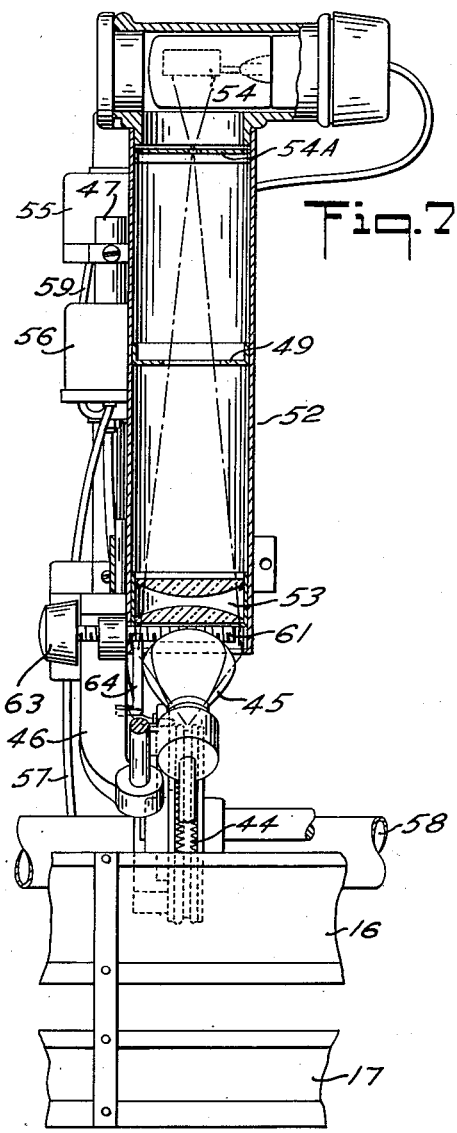
Figure 9:
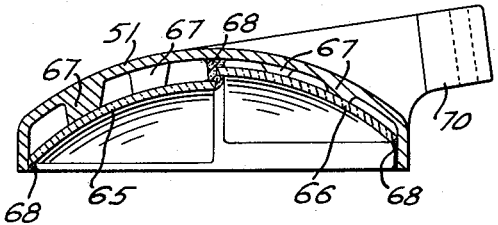
Figure 10:
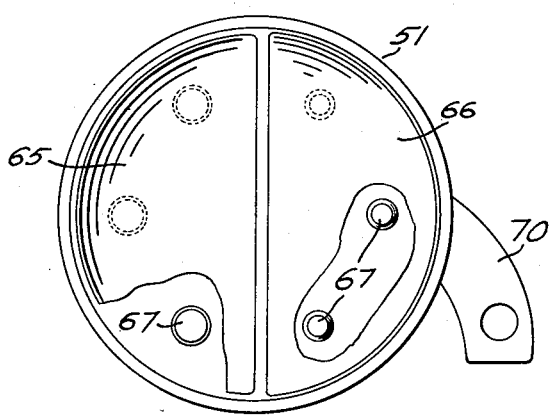
Figure 8:
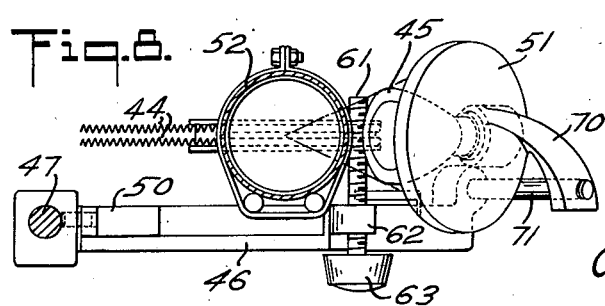
Figure 16:
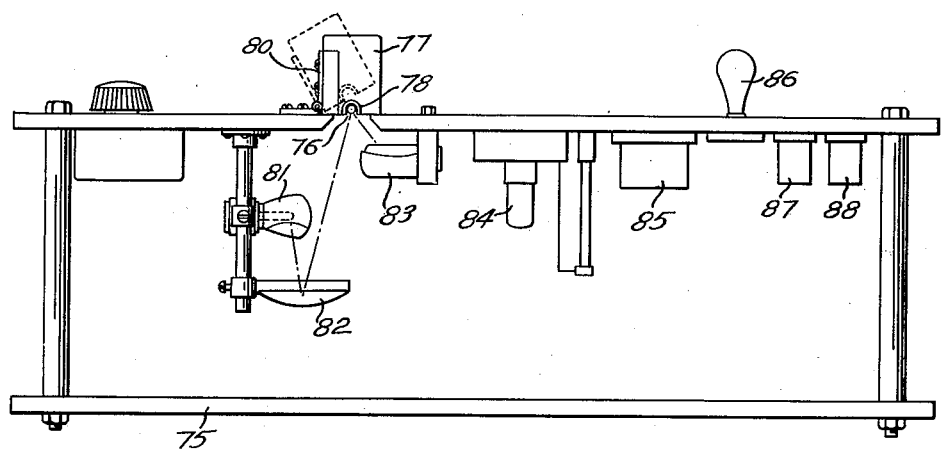
Figure 17:
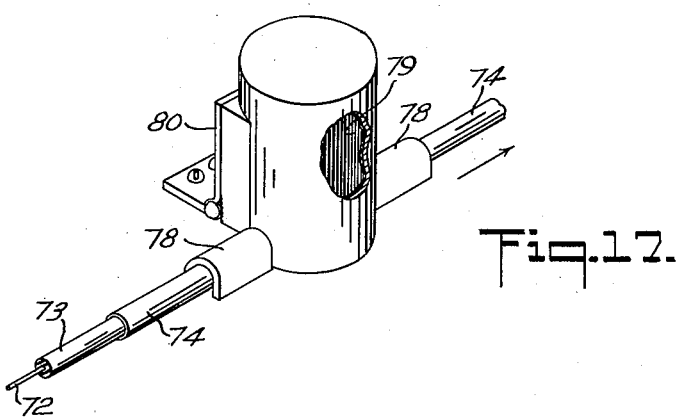
Figure 18:
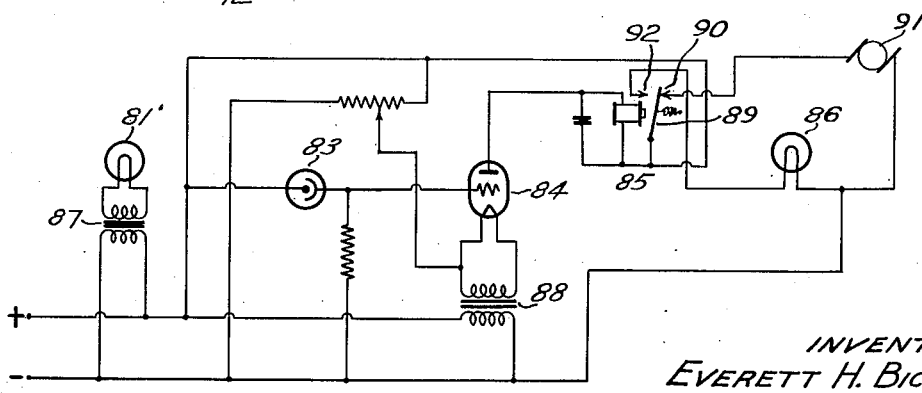

In the accompanying drawings, Fig. 1 represents an end elevation of a sorting machine embodying one form of the present invention; Fig. 2 represents a side elevation of a portion of the length of the machine; Fig. 3 represents a detail of the construction of the several guide discs showing the spiral face thereof; Fig. 4 represents a section on line 4—4 of Fig. 3, the disc being reversed from its operating position; Fig. 5 represents a fragmentary section of the guide disc on an enlarged scale; Fig. 6 represents a detail in elevation and part section of the light and sorting control and showing a modified form of conveyor; Fig. 7 represents an end elevation in part section of Fig. 6; Fig. 8 represents a section on line 8—8 of Fig. 6; Fig. 9 represents a transverse section of the novel reflector; Fig. 10 represents a front elevation of the reflector, parts broken away to show the rear abutments; Fig. 11 represents a perspective of a bean mounted for observation and study of light effect; Fig. 12 represents a bean being scanned and illustrative of light effect; Fig. 13 is a graph of color and glare; Fig. 14 represents the color, glare and shadow of a bean exposed to a direct overtop light beam; Fig. 15 represents the color, glare and shadow of a bean exposed to a light beam focussed in accordance with the present invention; Fig. 16 represents a sectional elevation of a modified form of the invention; Fig. 17 represents a detail in perspective of the hood assembly about the inspection point of the modification of Fig. 16; and Fig. 18 is a diagram of the circuit for the modification of Fig. 16.

Referring to the drawings, the sorting machine of the present invention consists of a plurality of sorting units arranged horizontally in spaced relation and supported at appropriate intervals by standards 10 carrying two superposed I beams, 11 and 12, from which arms 13 and 14 project laterally from opposite sides respectively of the beam as supports for the operating adjuncts of each unit. Since all of the sorting units are alike, the present description will be limited to one unit as explanatory of the invention.

Referring to the form of the invention shown in Fig. 1, and such other figures as relate thereto, a unit is shown, for example, as a rice sorter, though the invention is not to be considered as limited to this particular material, as obviously other articles or objects may be sorted thereby.

In order to collect the respective good and bad grains discharged after sorting, two conveyors 15 are arranged at opposite sides of the machine, each conveyor being in the form of a continuous chain with transverse flights so that at each side of the machine there is an upper trough 16 and a lower trough 17 through which the conveyor flights travel to eject the good grains at one end of the machine into a suitable receptacle and to eject the bad grains at the other end of the machine into a suitable receptacle. Two discharge chutes 18 and 19 at each side of the machine lead from the sorting point to the respective upper and lower conveyor troughs the bad grains being ejected into the trough 18 by an air puffing mechanism hereinafter described. Suitable driving means 21 are provided for the conveyors and receive power from a convenient source.

For supporting the rice grains on the way to the sorting point, two distributing discs 22, arranged in transverse side by side relation, are provided, each being keyed to its own vertically disposed shaft 23, which are respectively journalled in bearings provided in the arms 13A—13B and 14A—14B and driven through the medium of V-notch pulleys 24 by a driven belt 25. This belt 25 encircles the machine in a horizontal plane and is driven by power-transmitting means including a reduction gear box 26 and motor 27 mounted at one end of the machine upon the lower I beam. The upper face of each disc 22 is faced either with plastic or some other means to have the same color as the object to be sorted, in this instance it will be white to match the rice grains.

In order to arrange the rice grains in a row to pass the inspection or sorting point one at a time, axially apertured guide discs 28 of the same diameter as each disc 22 are mounted respectively in fixed position above the discs 22 with a space between each guide disc 28 and distributing disc 22 of approximately one-thousandth of an inch. This critical adjustment is obtained by inserting the hubs 30 of the respective guide discs 28 into ring clamps 31 respectively carried by oppositely disposed brackets 32 supported by the upper I beam, and placing shims of the required spacing thickness between each pair of guide discs and distributing discs, whereupon the guide discs 28, which are now free in the clamps 31, are lowered to rest upon the aforesaid shims. The clamp-adjusting studs 33 are now tightened, the shims removed and the guide discs 28 are thus accurately spaced with respect to the distributing disc 22. The lower face of each guide disc 28 is provided with a spiral channel 34 receding from the axis of the disc or inlet point to a discharge point coincident with the sorting or inspection point.

It should be noted that the channel 34 is formed by a straight side parallel to the axis of the disc 28 and an outwardly diverging side which terminates and merges into a circumferential groove 29. By the provision of this shape, a formed recess for the spiral is provided in juxtaposed relation to the lower disc so that it is impossible for rice grains to become wedged or ride each other in their travel along the spiral channel 34.

For delivering the rice to the axial aperture of each guide disc 28, a funnel 35 is provided having its delivery end seated within the hub 30 and terminating in operative relation to discharge the grain into the apertured center of the guide disc 28. Located in superposed relation to the funnels 35 is a bin or hopper 36 arranged to discharge the grain, or other objects being sorted, by gravity to two diverging pipes 37 leading respectively to the mouths of the funnels 35. Each funnel 35 is preferably provided with a shutter 38, slidable transversely thereon for manually stopping the discharge on any unit when required. Raising or lowering the funnel regulates the volume of rice fed to any unit. Preferably, an inclined partition 40 is provided in the hopper 36 to provide a space 41 which communicates with grain or other material leaving the hopper, in order to allow dust to rise therein and be drawn off by an exhaust fan 42 and air duct 43.

In the sorting machine shown in Fig. 6, which is more particularly for the sorting of beans, a spring belt conveyor 44 is provided to receive the beans as discharged from a hopper and arranges and carries the beans in single file to the inspection point, where discards are delivered to the upper conveyor trough, while selected good beans are ejected by an air puffer to discharge into the lower conveyor trough, as will hereinafter be fully explained.

For inspecting the grains, or beans, the invention provides a novel light system wherein more accurate sorting can be obtained than has been possible heretofore in any machine of like character. The present system comprises a lamp 45 mounted upon a bracket arm 46 pivoted to a rod 47 supported at a convenient location upon the machine. A set screw 48 serves to lock the arm 46 in operative position, which position is determined by a stop 50 fixed upon the rod 47. By loosening the screw 48 the arm 46 with its associated parts can be swung laterally away from the inspection point to allow access to other parts for adjustment or replacement. When returned to operative position the arm 46 abuts the stop 50, and the screw 48 then set in holding position. A reflector 51, preferably split along its medial line, as will be explained, is mounted to move with the arm 46, and is arranged to focus the reflected light rays upon any bean or rice grain brought to the inspection point. The mounting for the lamp 45 and the reflector 51 is so arranged that the axis of the cone of light from the reflector within the shield 51 strikes the bean or other object at an angle of approximately 43° to the vertical. The vertical, in this instance, is the axis of a tube 52 having a lens system 53 to focus the image of the illuminated bean upon an aperture plate 54A whereby selected portions of the light reach a photo-electric cell 54 located and enclosed in the upper end of the tube 52. An annular baffle 49 is mounted coaxially within the tube 52 and serves to dissipate stray light rays and thus ensures a neat image reaching the aperture plate 54A. The cell 54 is in an electric circuit including an amplifier unit 55 connected to a suitable source of voltage, the output of which is used to operate an electro-magnetic puffer valve 56, suitably mounted and arranged to open and close communication between a pipe 57, containing air under pressure from a pipe 58 supplied from a suitable source, and a conduit 59 leading to a nozzle 60 positioned so that a puff of air from the nozzle will eject the bean from the inspection point, provided the bean is a good bean and is to be deposited with other like beans in the lower conveyor trough. Thus, variations in the light to which the photocell is exposed will cause voltage variations, of which one voltage is predetermined for operation of the valve 56.

In order to regulate the brightness of the reflected light so that a definite constant voltage is maintained for valve operation, a shutter in the form of a rod 61 is threaded into a boss 62 of the arm 46 to intercept the cone of reflected light, and by adjusting this across the light the desired cutting off of a portion thereof is obtained. A thumb knob 63 is attached to the rod 61 for adjustment purposes. A strip spring 64 is arranged to bear against the rod 61 to hold it against displacement due to vibration or the like.

Since the scanning of the rice or bean is of the utmost importance for accurate and sensitive sorting, the present invention comprehends an ingenious and novel construction whereby errors due to specular glare are entirely eliminated. This will be explained as follows:

In the sorting of objects according to their color, the light reflected from the surface of the object consists of two kinds. The first is due to the color of the object, and the second is due to the sheen of the surface of the object. The first may be any color and any intensity, and is largely independent of surface irregularities or curvatures. The second partakes of the color of the source of illumination, and depends for its brilliancy on the smoothness of the surface, the angularity of the surface with respect to the impinging light rays and the position of the viewing eye, and the curvature of the surface. This second kind of light is called "specular glare." In the sorting of white objects like white beans, rice, and the like, for the detection and removal of impurities, the color is the determining factor, and the smoothness of the surface or the shininess of the skin is of no importance, commercially.

When an object is looked at by a person, specular glare and color are both seen in amounts depending on the angularity of the impinging light rays and the position of the viewing eye, but the attention is fixed only on the color in making a selection and the amount of specular glare is neglected.

When an object is looked at by a photo-cell, no act of the mind is possible to fix on the color and neglect the glare. These functions must be accomplished, if they are to be accomplished, by some other means.

When sorting white objects like beans or rice, the amount of light reflected for scanning by the photo-electric cell is largely determined by the color, and to a lesser extent by the glare. It was possible to obtain a satisfactory grade of sorting by the arrangement of the light source, reflector, bean carrier, and photo-cell in accordance with applicant's Patent No. 1,921,862, and Patent No. 1,921,863, when the results were compared to hand sorting. Now that hand sorting has been eliminated, and a greater accuracy of sorting is demanded, new conditions have to be met with improved constructions. It is furthermore desirable to sort other objects such as walnut meats, green peas, corn, brown rice, peanuts, green lima beans, steel parts, and the like, in which the color is a low intensity and the specular glare is of such a high amount, when viewed in any ordinary manner, that the signals given off by the photoelectric cell are meaningless for a color determination, indication or selection.

The shape of the object has a profound effect on the amount of specular glare thrown off at different angles. The size of the object determines the position in space of its reflecting surface, and, therefore, affects the amount of light it received from any system of illumination. In dealing, therefore, with beans which may vary as much as 100% in any dimension, and which may have radii of curvature of anything from infinity to one-sixteenth of an inch, a solution of the problem seemed as elusive as the determination of which way a bean would bounce when dropped on a flat surface.

Another consideration in the search for a scanning system to give correct signals for color without specular glare was the desirability of having a signal starting off with a peak in the wave of energy. This has the effect of overcoming electrical impedances, mechanical and fluid inertias existing in the associated equipment.

It will now be described how applicant's improved method of scanning and illuminating overcomes the above described difficulties, and accomplished the desired leading peak leading signal.

In order to visualize the action taking place, it is desirable to make an enlarged dummy bean, about an inch long, a half inch wide, and three-eighths of an inch thick. This should be painted a glossy gray and should be mounted on a standard like Fig. 11.

The flattened side is arranged to be on top. By illuminating the dummy from different angles and viewing it from different angles, it will be found that there are countless combinations of lighting and viewing angles possible, and with different distances of the reflector and lamp. Each produces a different combination of color and glare. These changes are not visible when looking at a bean in its natural state, as it is too small in the first place and the white of the bean makes the specular glare almost invisible. If the dummy bean is painted black, the specular glare is greatly brought out but the line between the color and the shadow is lost. The gray dummy shows the true conditions, and allows the best positions to be quickly and accurately determined.

It was found that the flattest portion was the proper side to look at. This made it necessary to arrange the photo-cell directly over the bean as it rested on the conveyor. The flat portion on all the beans was more nearly uniform than any other position. In looking at an end or side, there were greater changes of position and curvature, and although the high light from glare was smaller on the average the point nearest the cell moved in and out, as well as up and down making constant illumination difficult. The use of lenses to produce an image of the bean in front of the photo-cell, and then crop this image so that only a small and selected portion of the bean is looked at, was found desirable. The aperture or stop at the image was arranged to pass only the center third of the illuminated area of the bean of the smallest size, to the photo-cell.

Arranging the light at about 43 degrees above the horizontal as shown in Fig. 12, with the cell viewing from above the minimum highlight or glare spot, and the maximum color illumination of the balance of the top surface, and the minimum shadow was obtained. Any other position of the light source resulted in an increase of the size of the highlight spot, or a decrease in the color illumination, or an increase in the shadow.

Now to consider the moving effects. If the bean is moved toward the left, the shadow will show in the cell first. This will give a gradually building up signal as shown in Fig. 13, finally ending in a sudden peak as the highlight or glare spot comes into view of the cell. On the other hand, if the bean is moved toward the right, the highlight is seen first, followed by the color signal. This sudden peak of short duration is insufficient to actuate the sorting equipment, but it is useful in obtaining greater sensitivity of action, and to overcome inertia effects as was explained above.

As the beans are brought to the viewing point by the vibratory spring belts, they are arranged so that the long axis is parallel with the spring, and the flat side is up. This is the best position for scanning. Due to variations in shape or crowding on the belts, all beans are not perfectly positioned. The flattened side may be tilted from side to side a little, and this does not appreciably affect the signal with applicant's improved method of scanning. With any other arrangement of lighting and viewing, side tilting affects the signal and therefore the accuracy of the sorting. The only deviation of the bean which affects the signal is a lifting of the rear end of the bean to the extent that the light shines on the flattened portion.

A combination of conditions which would cause a lifting of the rear end of the bean and hold it high enough to throw the specular glare to the center of the bean are so rare as to be of no consequence.

In Fig. 14 is shown the relative area of the glare, color and shadow of a bean when viewed from the side, with the illumination from the other side but almost directly above. In contrast, Fig. 15 shows the relative areas of the glare, color and shadow when the same object is viewed with the arrangement of lamp and reflector and cell of the present invention. It will be seen that the glare has been reduced to about a tenth of its previous size. The color has been increased to four times its previous size, and the shadow has been reduced to about a tenth of its previous size.

Now considering the adjustments to compensate for variations of size.

Although the bean image has been cropped before it is received by the cell, so that a selected portion of the top of the bean is viewed, nevertheless a large bean on account of its height above the conveyor will include a different angle or cone of rays from the light reflector, and, therefore, have a different intrinsic brilliancy than a small bean. In addition to this, the cone of rays received by the lens system of the cell will be different for different sized beans, thereby introducing another variable. There is only one condition of adjustment in which a large bean and a small bean will receive and return the same amount of light flux, for the same color, and this is when the lamp filament is focussed at about the center of the smallest desired bean, and the lens system is adjusted to focus at the same point. The large bean will have a larger area, at a higher point, and a flatter area, and due to the fact that its center of illumination has moved to the right, due to the angularity of the light beam, it will be at a slightly lower intensity of illumination, and therefore its cropped image will affect the cell the same as the small bean. The final adjustment of the signal is made after the correct focus is obtained, by moving the light spot back and forward until the same signal is obtained from a small and a large and a medium sized bean, all of the same color. It will now be found that the signals and the sorting will be greatly improved, and will follow the color of the object without respect to the shininess of the surface.

By the present invention, this method of illumination and scanning objects for the purpose of photo-electric sorting, has made it possible to extend the usefulness of sorting equipment to darker objects having a shiny surface, which heretofore has been impossible on account of the disturbing effect of the specular glare. Since the specular glare is constant for all objects having a shiny surface regardless of the color, it shortly becomes, as darker colored objects are handled, a blinding effect to the cell, unless steps are taken to minimize or avoid it. The present invention reduces it to a very small point and then makes use of this residual amount to overcome inertia effects.

Attention is also directed to the novel reflector used with the partially hooded lamp 45, since this comprises two separate reflector portions 65 and 66 cut from the same sphere, and accurately positioned in the shield 51 to focus the light rays at the selected location upon the object at the sorting point. This positioning of the reflector parts takes place during the shaping of the pattern from which the shield is cast. Thus, when the pattern properly locates the portions 65 and 66, the shield 51 is cast therefrom and provides the internal backing lugs 67 against which the two reflector portions can be located so that each has its predetermined angular position required to focus the light beam. When so positioned each is held in fixed position in the shield by plaster of Paris or other cementing material as indicated at 68. The shield 51 is mounted upon an arm 70 carried by a pin 71 projecting from the bracket arm 46, and consequently forms a part of the swingable lamp unit.

The form of the invention shown in Figs. 16, 17 and 18, comprehends the detection of changes in the covering of an insulated wire, here shown, as of the type wherein the wire 72, is insulated with rubber 73 covered with a casing of nylon 74. In the manufacture of this type of insulated wire, the application of the nylon casing must be such as to completely cover the rubber insulation but in its application the nylon-extruding means frequently becomes clogged so that lengths of uncovered rubber are delivered from the machine. Since the feeding of the wire during the application of the nylon insulation is of the order of hundreds of feet a minute, it is obvious that a stoppage of the nylon will result in a long length of uncovered rubber insulation before the fault has been discovered. This results in serious loss of material as well as delays, either to cutting out of the uncovered sections or re-running the wire to patch the defective covering. The present modification of the invention comprehends a detecting unit arranged to be mounted at the outlet of the nylon-extruding machine to receive the wire therefrom and so inspect the wire that absence of nylon will be immediately detected and indication of the condition given to an attendant in order to stop the feeding of the wire.

In order that the novel unit can be used with present day wire insulating machines, the parts thereof are enclosed in a light tight box 75 having inspection opening 76 at a convenient location in the top thereof. This opening 76 is covered by a hood 77 open only at its bottom so as to encircle the opening 76 in a light tight manner. Oppositely disposed wire guides 78 are attached to or formed with the hood 77 at the respective sides thereof, having grooves of arcuate form to conform to the size and shape of the insulated wire which is to pass therethrough under the hood and across the inspection point. The inner faces of the sides and top of the hood are lined with tight-absorbing material to absorb all stray reflected light while allowing the wire to reflect the detecting image. Preferably the hood 77 is mounted on the box 75 by a hinge 80 which allows it to be swung out of operating position for insertion of the wire.

For focussing a beam of light upon the wire insulation as it traverses the inspection point, an electric lamp 81 is provided and properly shielded to direct rays of light therefrom upon a shielded reflector 82 which is in the correct position to focus the rays of light upon the wire. Adjacent the inspection point there is a photoelectric cell 83 in position to receive the reflected light image from the wire insulation. The output of this cell is amplified by an electronic tube 84 and delivered to the coil of a relay 85 which when energized shifts armature 89 from contact 90 to open the circuit of the motor 91 which serves to operate the feeding of the wire under observation. When this occurs the motor stops and since the armature 89 has moved against the contact 92 the circuit is closed to light an indicator lamp 86 mounted in viewing position exteriorly of the box 75. The circuit of Fig. 18 explains the current control having a source of voltage, which is transformed into lower voltage by a transformer 87 for the lamp 81 and a transformer 88 for the amplifier unit 84.

In this form of the invention it is desired to utilize the extra sheen or glare of the nylon over the rubber or other plastic covering on the wire, to create the operative signal in the photo-cell circuit. It has been found necessary therefore to arrange the reflector, wire and cell so that the principal ray from the reflector to the wire, and the ray from the wire to the cell from a very small angle with each other, in fact, as small an angle as is possible without optical interference. It is also desirable to have the plane of the rays perpendicular to the wire axis.

In operation the light source from the lamp 81 is adjusted so that the light image reflected by nylon insulation is ineffective to produce a voltage from the photo-cell 83 sufficient to actuate the relay. When, however, no nylon appears upon the wire and the rubber insulation reaches the inspection point, the photo-cell voltage changes and the relay 85 closes the circuit of the indicator lamp 86.

It will now be apparent that a complete unitary object sorting machine has been devised wherein the speed and accuracy of sorting has been materially increased. While in the drawings details of the scanning mechanism are shown in association with a spring conveyor for beans it is to be understod that the same scanning mechanism is used for sorting rice in the disc type of conveyor. In this connection it should be noted that by reason of the novel contoured channel in the guide disc 28, rice grains are not only prevented from becoming wedged but also are maintained in perfect single file relation to pass the light focussed point of inspection always in the same relative position. By the present construction, in conjunction with the improved ultra-sensitive scanning mechanism, rice grains can be color sorted at a high rate of speed. Furthermore, by adjusting the light control rod 61, relative to the focussed light, any selected degree of color of the rice can be sorted to meet commercial demands.

I claim:

1. In a color comparison sorting machine, the combination of means to feed objects one at a time past an inspection point, said objects having a rounded nose to present a restricted area of glare at said point a tube mounted with its axis passing through said inspection point, a photo-electric cell in said tube, means to direct light from selected portions of an image of an object at said point upon said cell, an optical system arranged to project a beam of light toward and opposite to the direction of travel of said objects and angularly approximately 43° to said tube axis to focus a spot of light upon a predetermined glare area so located as to reflect an amount of light insufficient during the travel of the object to operate said photo-electric cell and to also focus said spot upon a following color area sufficient to cause said image focussing means to project an image sufficient to operate said cell, and means operated by current variations of said photo-electric cell for segregating objects of the same color as a function of said color area.

2. In a color comparison sorting machine of the type having an optical system and a photo-electric cell for scanning rice grains at an inspection point, a rice feeding means comprising a horizontally disposed driven disc, means to rotate said disc, a fixed center apertured guide disc above and juxtaposed to said driven disc and spaced therefrom less than the thickness of a rice grain or other object to be sorted, said guide disc having a spiral groove in the lower face thereof extending from substantially the center thereof to an inspection point for arranging said grain in single file, and means to feed rice grains from said guide disc center to said spiral to be conveyed by frictional centrifugal force in said file arrangement to said inspection point.

3. In a color comparison sorting machine of the type having an optical system and a photo-electric cell for scanning rice grains at an inspection point, a rice feeding means comprising a horizontally disposed driven disc, said disc having a coated upper surface to match the color of the objects to be sorted, a fixed center apertured guide disc above and juxtaposed to said driven disc and spaced therefrom less than the thickness of a rice grain or other object to be sorted, said guide disc having a spiral groove in the lower face thereof extending from substantially the center thereof to an inspection point for arranging said grains in single file, and means to feed rice grains from said guide disc center to said spiral to be conveyed by frictional centrifugal force to said inspection point.

4. In a color comparison sorting machine of the type having an optical system and a photo-electric cell for scanning rice grains at an inspection point, a rice feeding means comprising a horizontally disposed driven disc forming a support for rice to be sorted, means to rotate said disc, a fixed center apertured guide disc above and juxtaposed to said driven disc and spaced therefrom less than the thickness of a rice grain, said guide disc having a spiral channel in the lower face thereof extending from substantially the center thereof to an inspection point, and means to prevent rice from wedging in said channel, and means to feed rice grains to said spiral channel to be conveyed one at a time to said inspection point by frictional centrifugal force caused by said driven disc.

5. In a color comparison sorting machine of the type having an optical system and a photo-electric cell for scanning rice grains at an inspection point, a rice feeding means comprising a horizontally disposed driven disc forming a support for rice to be sorted, means to rotate said disc, a fixed center apertured guide disc above and juxtaposed to said driven disc and spaced therefrom less than the thickness of a rice grain, said guide disc having a spiral channel in the lower face thereof extending from substantially the center thereof to an inspection point, said channel having a circumferential groove in one side thereof, and means to feed rice grains to said spiral channel to be conveyed one at a time to said inspection point by frictional centrifugal force caused by said driven disc.

6. In a color comparison sorting machine of the type having an optical system and a photo-electric cell for scanning rice grains at an inspection point, a rice feeding means comprising a horizontally disposed driven disc forming a support for rice to be sorted, means to rotate said disc, a fixed center apertured guide disc juxtaposed to said driven disc and spaced therefrom less than the thickness of a rice grain, said guide disc having a spiral channel in the lower face thereof extending from substantially the center thereof to an inspection point, said channel having a wall parallel to the axis of the disc and a wall inclined to such axis, and means to feed rice grains to said spiral channel to be conveyed one at a time to said inspection point by frictional centrifugal force caused by said driven disc.

7. In a color comparison sorting machine of the type having an optical system and a photo-electric cell for scanning rice grains at an inspection point, a rice feeding means comprising a horizontally disposed driven disc forming a support for rice to be sorted, means to rotate said disc, a fixed center apertured guide disc juxtaposed to said driven disc and spaced therefrom less than the thickness of a rice grain, said guide disc having a spiral channel in the lower face thereof extending from substantially the center thereof to an inspection point, said channel having a wall parallel to the axis of the disc and a wall inclined to such axis, said inclined wall having a circumferential groove therein, and means to feed rice grains to said spiral channel to be conveyed one at a time to said inspection point by frictional centrifugal force caused by said driven disc.

8. In a color comparison sorting machine, the combination of means to feed objects one at a time past an inspection point, said objects each having a rounded nose to form a relatively small area of glare and a relatively large color area at said point, a photo-electric cell located to view said color area of said objects at said inspection point for color sorting, a source of light, an optical system for focussing a light beam from said source on said inspection point to intercept an object at said point, means to mount said system to project said beam angularly to meet an object entering and passing said point to produce a minimum signal from said glare area of ineffective photo-cell operating duration and a maximum signal from said color area of effective photo-cell operating duration, and means operated by current variations of said photo-electric cell in response to said color signal for segregating objects of the same color as a function of color signal.

9. In a color comparison sorting machine, the combination of means to feed objects one at a time past an inspection point, a tube mounted with its axis passing through said inspection point, a source of light, an optical system for projecting a beam of light from said source toward and opposite to the direction of travel of said object and angularly with respect to said tube axis, to focus a spot of light upon an object at said inspection point to produce a minimum signal from a glare area of ineffective photo-cell operating duration and a maximum signal from a color area of effective photo-cell operating duration, said objects respectively having rounded noses forming a relatively small glare area and a relatively large color area when exposed to said focussed beam of light, a photo-electric cell in said tube located to view said color area of said objects during the travel of said objects past said inspection point, and means operated by current variations of said photo-electric cell for segregating objects of the same color as a function of said color area.

10. In a color comparison sorting machine, the combination of means to feed objects one at a time past an inspection point with the axis of said objects parallel to the axis of travel, a source of light, an optical system arranged to focus a beam of light from said source toward and opposite to the direction of travel of said objects and angularly to the vertical in the plane of said travel to produce a minimum signal from a glare area of ineffective photo-cell operating duration and a maximum signal from a color area of effective photo-cell operating duration, each of said objects having a rounded nose to form a leading relatively small glare area and a trailing relatively large color area when intercepting said beam, means including a photo-electric cell disposed vertically above said inspection point and being located to view said color area of said objects when an object passes said inspection point, and means operated by current variations of said cell for segregating objects of the same color as a function of the color area.

11. In a color comparison sorting machine, the combination of means to feed objects one at a time past an inspection point, said objects each having a rounded nose to form a relatively small area of glare and a relatively large color area at said point, a photo-electric cell located to view said color area of said objects at said inspection point for color sorting, a source of light, an optical system for projecting a light beam from said source on said inspection point to intercept an object at said point, said system including two reflectors formed respectively of spherical segments having substantially the same center of generation, means to mount said reflectors at different angles to focus reflected light beams at the same point with two light source images in superposed relation to produce a minimum signal from said glare area of ineffective photo-cell operating duration and a maximum signal of effective photo-cell operating duration, and means operated by current variations of said photo-cell for segregating objects of the same color as a function of the light image on said object.

EVERETT H. BICKLEY.

REFERENCES CITED

The following references are of record in the file of this patent:

UNITED STATES PATENTS

| Number | Name | Date |
| --- | --- | --- |
| 106,184 | McLaughlin | Aug. 9, 1870 |
| 981,310 | Ringland | Jan. 10, 1911 |
| 1,051,877 | Gabbett-Fairfax | Feb. 4, 1913 |
| 1,225,172 | Privett | May 8, 1917 |
| 1,294,741 | Winkley | Feb. 18, 1919 |
| 1,396,221 | Ladd | Nov. 8, 1921 |
| 1,626,359 | Rundell | Apr. 26, 1927 |
| 1,696,048 | McCormick | Dec. 18, 1928 |
| 1,812,294 | Hohn | June 30, 1931 |
| 1,862,351 | Hagiwara | June 7, 1932 |
| 1,921,862 | Bickley | Aug. 8, 1933 |
| 1,965,373 | Fitzgerald | July 3, 1934 |
| 2,008,410 | Wilson | July 16, 1935 |
| 2,065,557 | Berry | Dec. 29, 1936 |
| 2,077,740 | Caughlan | Apr. 20, 1937 |
| 2,131,096 | Cox | Sept. 27, 1938 |
| 2,137,187 | Stoate | Nov. 15, 1938 |
| 2,152,758 | Cox | Apr. 4, 1939 |
| 2,190,563 | Horsfield | Feb. 13, 1940 |
| 2,263,938 | West | Nov. 25, 1941 |
| 2,311,101 | Tuttle | Feb. 16, 1943 |
| 2,325,665 | Cox | Aug. 3, 1943 |